United States Patent [19]

Lob

[11] Patent Number: 4,506,447
[45] Date of Patent: Mar. 26, 1985

[54] CENTER DISTANCE MEASURING TOOL
[75] Inventor: James P. Lob, Oconomowoc, Wis.
[73] Assignee: Deere & Company, Moline, Ill.
[21] Appl. No.: 534,997
[22] Filed: Sep. 22, 1983
[51] Int. Cl.³ .............................................. G01B 5/14
[52] U.S. Cl. ............................ 33/181 R; 33/180 AT;
33/181 AT
[58] Field of Search ....... 33/181 R, 180 AT, 181 AT,
33/180 R, 169 R, 161, 143 R, 202, 185 R, 143
M, 412, 454, 464

[56] References Cited
U.S. PATENT DOCUMENTS

| | | | |
|---|---|---|---|
| 1,262,678 | 4/1918 | Lapoint | 33/143 M |
| 1,598,248 | 8/1926 | Paine | 33/412 |
| 2,522,283 | 9/1950 | Lamkin | 33/412 |
| 3,483,631 | 12/1969 | Bourgeois | 33/180 R |
| 4,128,945 | 12/1978 | Barritt | 33/181 R |
| 4,212,111 | 7/1980 | Saari | 33/181 AT |

Primary Examiner—Willis Little

[57] ABSTRACT

A center distance tool comprising a mounting block defining an open ended chamber, an indicator bar fixably mounted to another mounting block perpendicular to the chamber. A gauge bar slidably maintained longitudinally to said indicator bar, the gauge bar having a generally L-shaped configuration. A script plate mounted to gauge bar for visual read out of center distance.

3 Claims, 2 Drawing Figures

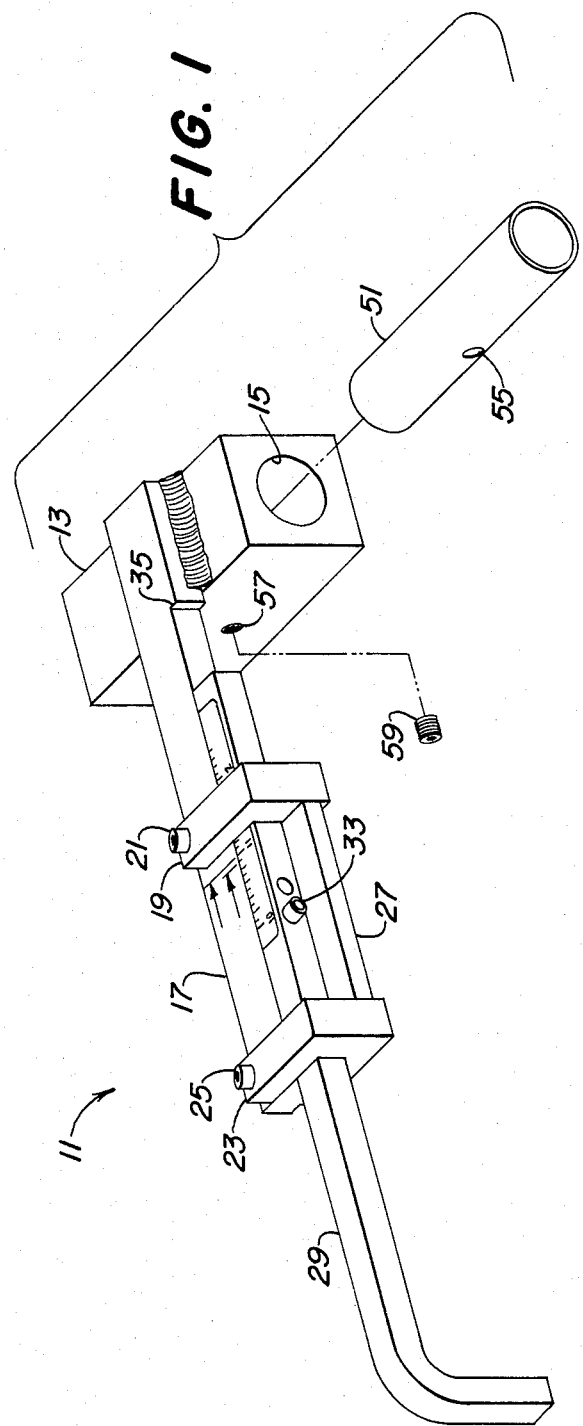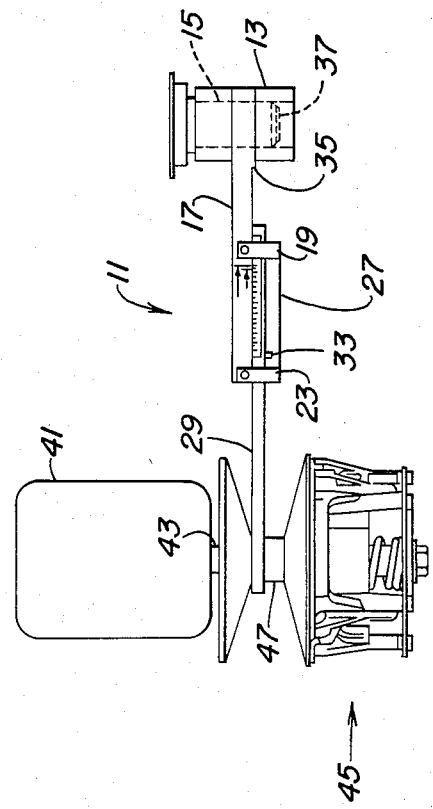

CENTER DISTANCE MEASURING TOOL

BACKGROUND OF THE INVENTION

This invention relates to a tool for measuring the center distance between two generally parallel extending shafts, and more particularly, measuring the distance between an engine crank shaft and a cross shaft of a snowmobile.

By way of illustration, a snowmobile engine is customarily aligned such that the crank shaft of the engine extends generally transverse in the vehicle. A track driven shaft is also aligned transverse in the vehicle in close proximity to the engine crank shaft. The engine crank shaft has a pulley assembly mounted at one end external to the engine in cooperative alignment to a second pulley mounted to one end of the driven shaft, the pulleys being in belt communication. The other end of the driven shaft is in chain communication to the vehicle track system.

The pulley assemblies on the crank shaft and driven shaft collectively comprise an infinitely variable transmission. It is important that the engine crank shaft and the driven shaft be properly spaced apart and aligned to facilitate extended belt life between the pulleys.

SUMMARY OF THE INVENTION

It is an object of the present invention to present a tool for measuring and assuring the proper center distance between the engine output shaft or crank shaft and the driven shaft of a snowmobile.

The tool is comprised of a mounting block having an elongated cylindrical opening extending therethrough. An indicator bar is mounted to the mounting block perpendicular to the cylindrical opening. A plurality of generally C shaped clamp, hereinafter C-clamp, are fixably mounted to the indicator bar such that a gauge bar can be slidably and restrainably received between the indicator bar and C meters. The gauge bar has a curved portion at one end and a retaining pin 33 which is located between the two C members to restrict the degree of linear motion of the gauge bar relative to the indicator bar.

The driven shaft can be received in the cylindrical opening of the mounting block allowing the gauge bar to be slipped around the base of a pulley mounted to the snowmobile engine output shaft. The gauge bar is script such that the distance between the center of the driven shaft and the pulley base, i.e. the output shaft, can be read readily from the gauge bar.

BRIEF DESCRIPTION OF THE DRAWINGS

FIG. 1 is a prospective view of a center distance measuring tool in accordance with the present invention.

FIG. 2 is a top view of a snowmobile motor and driven shaft with the center distance tool attached thereto.

DESCRIPTION OF THE PREFERRED EMBODIMENT

Referring to the figures, the center distance alignment tool generally indicated as 11, includes a mounting block 13 defining a cylindrical opening chamber 15 open at each end. An indicator elongated bar 17 is fixably mounted at one end to the mounting block 13 and extends generally perpendicular to the cylindrical chamber 15. A first and second C-clamp 19 and 23 respectively are fixably mounted to the indicator bar 17 in spaced apart relationship by any conventional means such as by respective screws 21 and 25. A base plate 27 is fixably mounted between the clamps 19 and 23 below the indicator bar 17 by any conventional means such as welding.

A gauge bar 29 is slidably received between the respective C-clamps 19 and 23 and the indicator 17 to extend parallel and longitudinally abutting to the indicator bar 17. The gauge bar 29 includes a curved end portion 31 which has a generally perpendicular orientation to both the cylindrical chamber 17 and gauge bar 29. A portion of a retaining pin 33 is fixably mounted in one of a plurality of seats 34 within the side of the gauge bar 29 such that the retaining pin 33 limits the degree of longitudinal motion of the gauge bar 29 by bringing the retaining pin in contacted with either C-clamp 19 or 25. Longitudinal motion of gauge bar 29 can also be restricted by seat 35 in indicator bar 17.

Referring more particularly to FIG. 2, a driven shaft 37 is received in the chamber 15 allowing the gauge bar 29, curved portion 31 to travel and rest the base 47 of a pulley clutch 45 fixably mounted around portion of the output shaft 43 of a motor 41. The pulley shaft base 47 is central to the output shaft 43. A script plate 50 is fixably mounted to the gauge bar 29 and is calibrated such that markings "A" placed on the indicator bar 17 align to visual display the center distance between the driven shaft 37 and output shaft 43.

An insert 51 defining a second cylindrical opening 52 can be slidably placed into the cylindrical opening 15 and secured therein by a pin 59 which journeys into a hole 57 in the side of the mounting block 13 to be fixably received in a transverse hole 55 of the insert 51 allowing the gauge center distance tool to accomodate varying sized driven shafts.

What is claimed is:

1. A service tool for measuring the center distance between two generally parallel extending shafts comprising:
   a mounting block defining a first elongated open ended cylindrical chamber;
   an indicator bar fixably mounted to said mounting block perpendicular to said cylindrical chamber;
   a gauge bar having a generally L-shape;
   a first clamp;
   a second clamp;
   said first and second clamps fixably mounted to said indicator bar in spaced apart relationship and slidably maintaining said gauge bar parallel and longitudinally abutting to said indicator bar such that said gauge bar has a portion perpendicular to both said cylindrical chamber and said indicator bar; and,
   a retaining pin fixably mounted in said gauge bar between said clamps and having a portion of said retaining pin external to said gauge bar such that said external portion of said retaining pin is in abutting alignment to at least one of said clamps.

2. A service tool as claimed in claim 1 further comprising a generally cylindrical insert defining an elongated opening ended chamber, said insert size to be matingly received and fixably and detachably mounted in said first cylindrical chamber.

3. A service tool for measuring the center distance between two generally parallel extending shafts comprising:

a mounting block defining a first elongated open ended cylindrical chamber;

an indicator bar fixably mounted to said mounting block perpendicular to said cylindrical chamber;

a gauge bar having a generally L-shape;

a first clamp;

a second clamp;

said first and second clamps fixably mounted to said indicator bar in spaced apart relationship and slidably maintaining said gauge bar parallel and longitudinally abutting to said indicator bar such that said gauge bar has a portion perpendicular to both said cylindrical chamber and said indicator bar; and, a generally cylindrical insert defining an elongated opening ended chamber, said insert size to be matingly received and fixably and detachable mounted in said first cylindrical chamber.

* * * * *